United States Patent
Alexander

[11] 3,913,762
[45] Oct. 21, 1975

[54] COMBINATION HAND AND LIFT CART

[76] Inventor: Chancey L. Alexander, 278 Lynwood Circle, Long Beach, Miss. 39560

[22] Filed: Aug. 26, 1974

[21] Appl. No.: 500,233

[52] U.S. Cl. ............... 214/506; 280/47.24; 214/370
[51] Int. Cl.² ............................................ B62B 1/00
[58] Field of Search .................... 214/370, 380–384, 214/373, 506, 85.5, 85.1; 280/47.24; 180/19 R

[56] References Cited
UNITED STATES PATENTS

| | | | |
|---|---|---|---|
| 1,337,861 | 4/1920 | Volk | 280/47.24 X |
| 2,188,578 | 1/1940 | Robinson | 280/47.24 |
| 2,483,908 | 10/1949 | Jackson | 280/47.24 X |
| 3,360,145 | 12/1967 | Bloxsom et al. | 214/506 |
| 3,363,787 | 1/1968 | Macomber | 214/370 |
| 3,692,135 | 9/1972 | Holzmann | 180/19 R |

FOREIGN PATENTS OR APPLICATIONS

| | | | |
|---|---|---|---|
| 35,372 | 1/1965 | Germany | 214/370 |
| 1,373,137 | 10/1964 | France | 214/370 |

*Primary Examiner*—Albert J. Makay
*Attorney, Agent, or Firm*—James B. Lake, Jr.

[57] ABSTRACT

A pair of inverted isosceles triangular trusses, similar and each having an obtuse angle and oppositely disposed ends, spaced transversely apart and parallel by cross-members joining the trusses at their respectively similar angles and at the sides opposite the cross-member joining the trusses at their respective obtuse angles. The obtuse angle cross-member is extended beyond each truss as an axle for mounting on each extension a wheel each having a common radius of less than the altitude of the triangular trusses at the obtuse angle. The sides of the trusses opposite the obtuse angles are extended at one end beyond the joining cross-member for resting on any horizontal support. The sides opposite this extended end are also extended outward and brought together to define a sleeve for slidably engaging an extendable handle. A rectangular stud is fixed to the sleeve, approximately normal thereto, for removably mounting a hand winch or reel on an upper portion, and a jack on the lower portion. The wheels are provided with brakes that are hand operable from a lever mounted on the sleeve.

3 Claims, 2 Drawing Figures

COMBINATION HAND AND LIFT CART

BACKGROUND OF THE INVENTION

1. Field of the Invention

The invention relates generally to wheeled carts, and more particularly to a combination two-wheeled hand and lift cart.

2. Description of the Prior Art

Heretofore the prior art has taught a two-wheeled hand truck or cart having its wheels mounted under one end of a flat upright body with the other end defining handles. A toe plate is mounted at the wheel end of the body extending normal thereto for sliding under a load edge, and a means for securing the upper part of the load to the flat body more or less adjacent its handle end.

References on the above features are U.S. Pat. Nos. 896,228 to Moore; 1,322,633 to Shannon; 2,113,780 to Yeats; and 2,160,556 and 2,197,587 to Miller.

Various means for aiding in tilting a load for transfering its weight from the toe plate to the wheels only are found in U.S Pat. Nos. 2,607,606 to Millen; and 1,322,633 to Shannon.

Brakes for two-wheeled carts are taught by U.S. Pat. No. 3,276,550 to Honeyman. A hand reel mounted on an upright flat body pivoted to the end of a four-wheeled cart is taught by U.S. Pat. No. 1,425,969 to Morrow.

SUMMARY OF THE INVENTION

It is an object of the invention to provide a two-wheeled hand cart for lifting and carrying comparatively heavy loads from ground level to motorized truck bed level and transferring said load to the truck bed and vice versa back down to ground level. The comparatively heavy loads contemplated are those requiring at least two men or a motorized lift truck to handle.

DESCRIPTION OF THE PREFERRED EMBODIMENT

Figure 1:
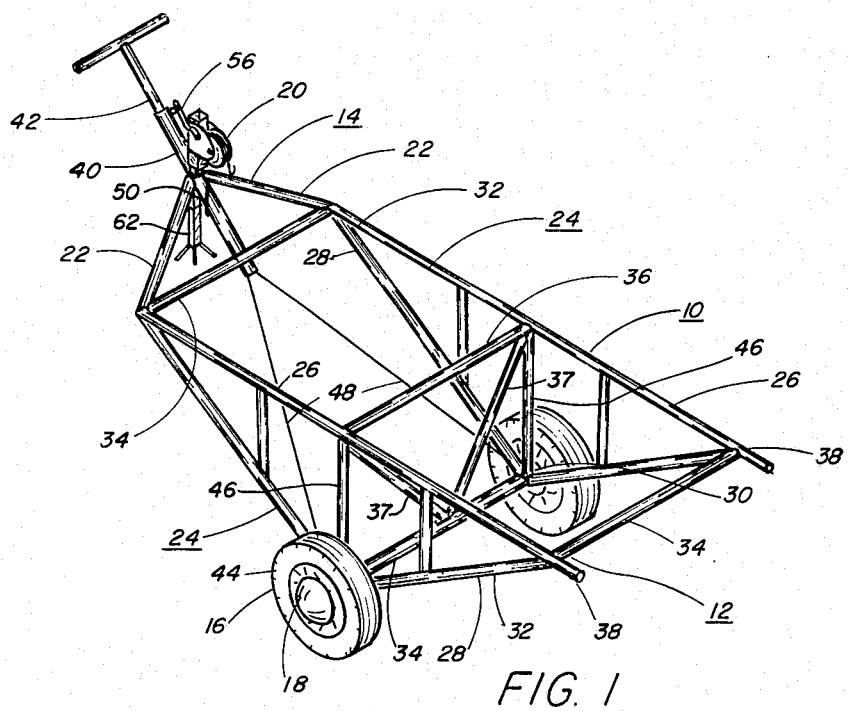
FIG. 1 is a three dimensional view of the cart of the invention, and, FIG. 2 is a side view enlarged of a part of the matter illustrated in FIG. 1.
Figure 2:
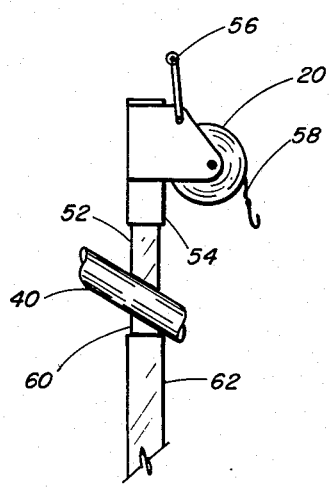

Referring to FIGS. 1 and 2, the invention comprises a flat-topped frame body 10 having a loading end 12 and a handle end 14. Wheels 16 are mounted equidistant from the body ends on axles 18 normally spaced from frame body 10. A winch 20 is mounted on an extension 22 of handle end 14 for winching loads on and off loading end 12 of frame body 10.

Frame body 10 comprises two similar triangular frame trusses 24, each having a long side 26 and two equal and shorter sides 28, the last defining an obtuse angle 30 therebetween. Two equal acute angles 32 are defined between between shorter sides 28 and opposite ends of longer side 26. Trusses 24 are rigidly spaced apart and joined in parallel by transverse frame members 34 respectively connecting truss side junctions defining the obtuse and equal angles 30 and 32. Additionally, the midpoints of long side 26 are connected by a similar transverse frame member 36. Reinforcing struts 37 brace transverse frame members 34 and 36, the first mentioned of which is extended beyond trusses 24 respectively to form axles 18 on which wheels 16 are rotationally mounted. Long sides 26 of frame body 10 have extensions 38 on the loading end 12 for engaging horizontal surfaces such as the ground and truck beds and tailgates. Short sides 28 adjacent handle end 14 of frame body 10 also have upward and outward extensions 22 that join to define a sleeve 40 for slidably mounting a handle 42 there in. The handle is slidably adjustable to provide leverage for tilting the cart commensurate with the magnitude of a load.

Wheels 16 are of the same radius 44 which is less than the altitude strut 46 from long side 26 to obtuse angle 30 junction of shorter sides 28. Wheels 16 are provided with interior brakes (not shown) operable by cables 48 attached to hand lever 50 mounted on sleeve 40.

A stud 52, square in cross-section, is also fixed to sleeve 40 for removably engaging a female counterpart 54 on which winch 20 is secured for hand operation of a crank 56 which controls a drum (not shown) on which a line 58 is wound. Stud 52 extends upward.

A similar lower stud 60 is also fixed to seeeye 40 to extend downward for similarly engaging a jackable leg 62 forming, when so engaged, alternatively with wheels 16 and extensions 38 an adjustable tripod support for frame body 10.

To operate, the cart is rolled over to a load on the ground and tipped for loading end extensions 38 to extend slightly under an edge of said load. Line 58 is led out from winch 20 and looped around said load below its center of gravity. Hand crank 56 is rotated to wind up line 58 and winch said load on to frame body 10. Handle 42 is slidably adjusted in sleeve 40 to provide the necessary leverage to easily raise loading end 12 by pushing down on handle 42. If the hand brakes had been set after tipping the cart for winching, they are now released and the cart rolled over to the end of a motorized truck to which the load is to be transfered. Handle end 14 is further depressed as the truck is approached, removing or jacking up said jackable leg as necessary, to engage loading end extensions 38 over truck tailgate or bed. Frame body 10 can be leveled if desired by jacking down said jackable leg. The load can be winched off frame body 10 onto truck by reaving line 58 through a pulley fastened to the front of said truck bed and then around said load.

What is claimed is:

1. A combination hand and lift cart for manually lifting, lowering and carrying unitary heavy loads to and from ground and truck-bed levels and horizontally, comprising:
   a. a pair of isosceles triangular trusses with equal sides and opposite acute angles, said equal sides being shorter than a longer side opposite an obtuse angle;
   b. transverse frame members horizontally spacing said triangular trusses parallely apart with similar sides and angles opposing and connected at their respective angles and the respective centers of said longer sides to define a flat-topped frame body having oppositely disposed ends, one of said ends of said body frame being extended in line with said longer sides and adapted to engage the bed of a truck for loading and unloading purposes and the other of said ends being extended in line with adjacent shorter sides and brought together to define a sleeve having a free end and oppositely disposed studs fixed thereon normal to the plane of said longer sides, and a transverse frame member joining said obtuse angles defining a transverse center axis around which said flat-topped frame body is adapted to tilt;

c. a handle adapted to be slidably mounted in said sleeve for extending the length of said flat-topped frame body relative to said center axis, and hence the leverage of any force applicable to said handle for tilting said frame body around said axis;

d. axles fixed to said transverse frame member defining said transverse center axis; and e. wheels of equal radius mounted for rotation on said axles, said radius being less than than a perpendicular dropped from either longer side to either opposite obtuse angle of one of said similar trusses, said radius, perpendicular and lengths of said truss sides being related in a ratio adapted for said one of said oppositely disposed ends of said flat-topped frame body, when tilted about said transverse center axis, to reach truck-bed level when the other of said ends is adjacent ground level.

2. A combination hand and lift cart as described in claim 1 wherein the lower of said oppositely disposed studs removably mounts a jackable leg for jacking up and down the other of said oppositely disposed frame body ends.

3. A combination hand and lift cart as described in claim 1 wherein the upper of said oppositely disposed studs removably mounts winch means for winching a unitary load on and off said frame body over the one of said oppositely disposed ends thereof at ground and truck-bed levels.

* * * * *